United States Patent [19]
Williams

[11] Patent Number: 5,878,730
[45] Date of Patent: Mar. 9, 1999

[54] LAWN MOWER POWERED BY ALTERNATIVE FUELS USING A FUEL INJECTOR ADAPTED FOR GASEOUS FUELS

[76] Inventor: Parke Donald Williams, 14115 Broadfording Church Rd., Hagerstown, Md. 21740

[21] Appl. No.: 949,477

[22] Filed: Oct. 14, 1997

Related U.S. Application Data

[63] Continuation-in-part of Ser. No. 663,806, Jun. 14, 1996, Pat. No. 5,676,117.

[51] Int. Cl.$^6$ ...................................................... F02B 43/00
[52] U.S. Cl. ............................................................ 123/527
[58] Field of Search ..................... 48/144, 219; 431/344; 123/527

[56] References Cited

U.S. PATENT DOCUMENTS

| | | | |
|---|---|---|---|
| 2,189,022 | 2/1940 | Steiner | 48/144 |
| 3,978,823 | 9/1976 | Simon . | |
| 4,285,886 | 8/1981 | Delfino | 48/144 |
| 5,203,046 | 4/1993 | Shaw . | |
| 5,325,838 | 7/1994 | Bennet . | |
| 5,377,646 | 1/1995 | Chasteen . | |
| 5,417,565 | 5/1995 | Long | 431/344 |
| 5,490,496 | 2/1996 | Lin | 431/344 |
| 5,551,407 | 9/1996 | Greenway | 123/527 |
| 5,580,240 | 12/1996 | Hattori | 431/344 |
| 5,676,117 | 10/1997 | Williams | 123/527 |
| 5,707,408 | 1/1998 | Kudo | 48/144 |

FOREIGN PATENT DOCUMENTS

| | | |
|---|---|---|
| 1158934 | 7/1969 | United Kingdom . |
| 81/00282 | 2/1981 | WIPO . |
| 92/08888 | 5/1992 | WIPO . |

*Primary Examiner*—Erick R. Solis
*Attorney, Agent, or Firm*—Richard C. Litman

[57] ABSTRACT

A lawn mower which is powered by an engine that uses gaseous fuels, such as liquified petroleum gas (LPG), compressed natural gas (CNG) or liquified natural gas (LNG). It may be either built originally to use gaseous fuels, or it may be converted from using liquid hydrocarbon fuels such as gasoline or diesel fuel. It may also use a combination of gaseous and liquid hydrocarbon fuels. The lawn mower may be hand-pushed or be self-propelled. It may include a fuel injector having a cylindrical main body housing, a coupling connecting a fuel hose and the main body housing, a gaseous venturi retained within the main body housing, an air intake in the main body housing, a sleeve that can slide over the air intake, and a docking collar with a plurality of slots that fits over the main body housing. The fuel injection system uses blow-by to recirculate any unused fuel or air thereby increasing the efficiency of the injection system. The fuel injection system can be automated or operated manually. The valve is used with disposable small gas canisters.

8 Claims, 7 Drawing Sheets

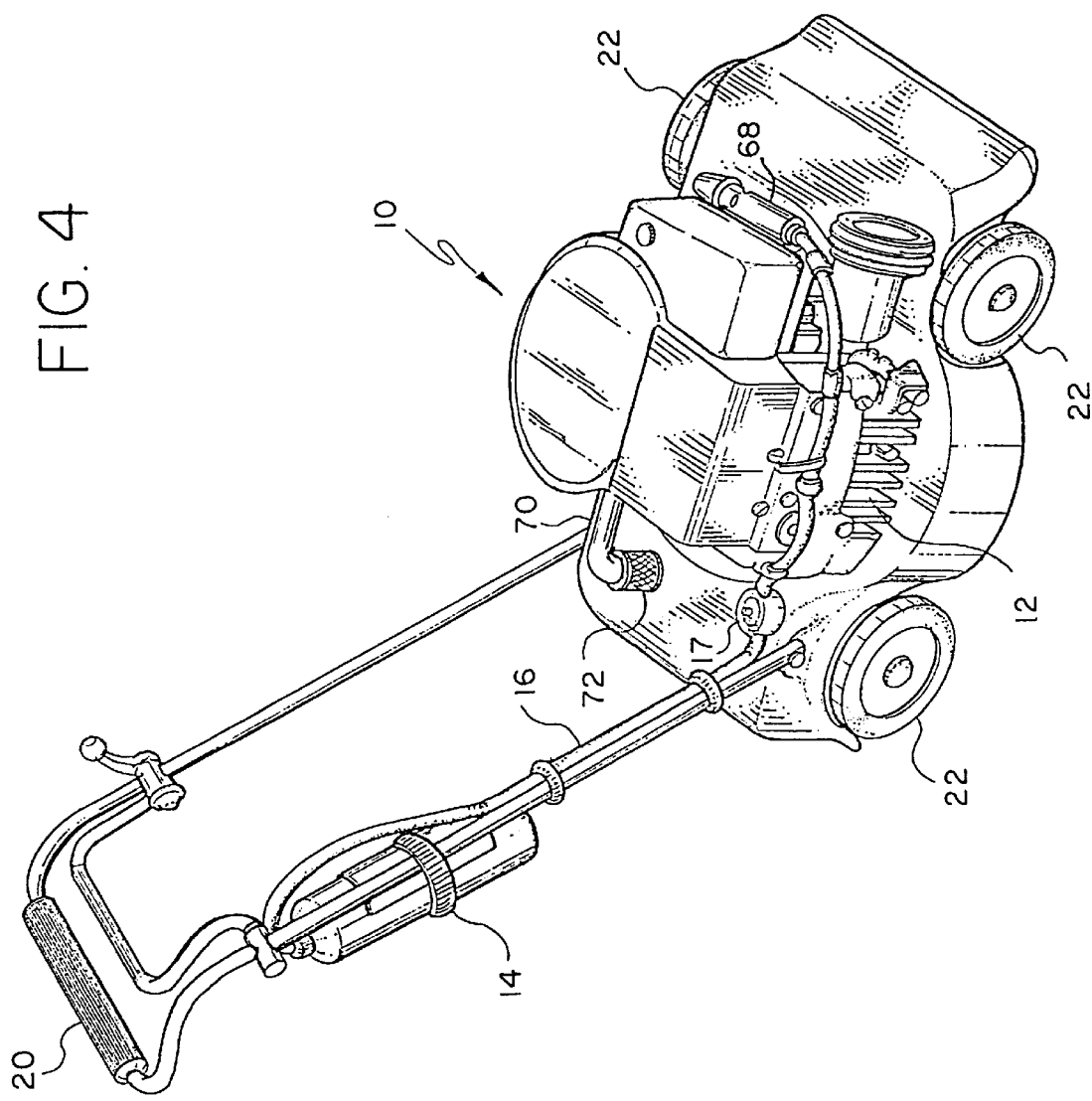

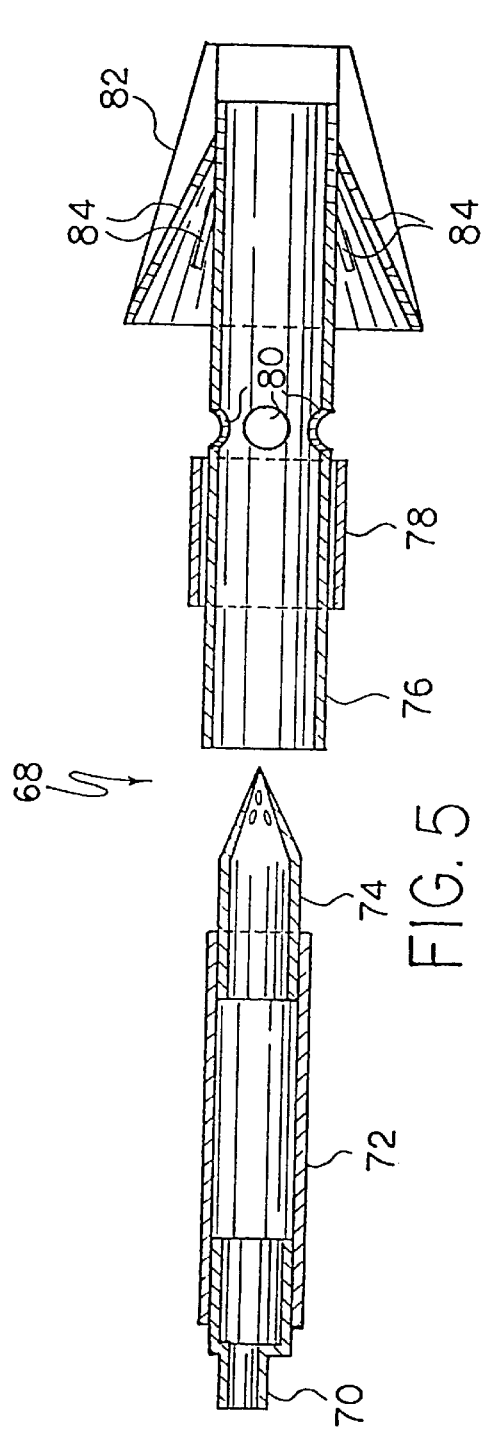
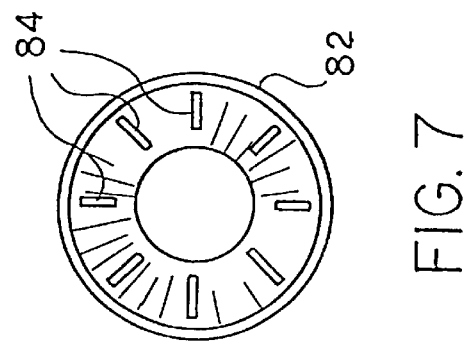

LAWN MOWER POWERED BY ALTERNATIVE FUELS USING A FUEL INJECTOR ADAPTED FOR GASEOUS FUELS

CROSS REFERENCE TO RELATED APPLICATION

This application is a Continuation-In-Part which claims the benefit of Utility patent application Ser. No. 08/663,806 filed Jun. 14, 1996, now U.S. Pat. No. 5,676,117 issued Oct. 14, 1997.

BACKGROUND OF THE INVENTION

1. Field of the Invention

The present invention relates to a lawn mower powered by alternative, preferably gaseous fuels, e.g., liquified petroleum gas (LPG), compressed natural gas (CNG), liquified natural gas (LNG), or other gaseous hydrocarbon fuels. The present invention uses a novel fuel injection system that includes a specially designed valve capable of regulating the flow of gas from disposable small gas canisters.

2. Description of the Related Art

Natural gas is a mixture of short-chain alkyl hydrocarbons and other gases, primarily methane, but also including ethane, propane and butane, that occurs naturally in underground chambers over petroleum deposits, and is also the lightest fraction formed when crude oil is processed. Under low temperature it condenses to form a liquid, called liquified natural gas (LNG), in which state it occupies a smaller volume than in its gaseous state, so that it may be stored and transported economically. If kept under high pressure, which also reduces its volume, but still in a gaseous state, it is called compressed natural gas (CNG). Liquified petroleum gas (LPG) is a by-product of natural gas processing and crude oil refining. Because it is composed of the heavier hydrocarbons in natural gas, primarily propane and butane, it will liquify under pressure, but reverts to a gaseous state when the pressure is released, as in an engine. Pure propane may also be used as a gaseous fuel. The same amount of energy may be provided at a lower cost by gaseous fuels than by gasoline. Gaseous fuels may also burn more cleanly, thus reducing pollution to the earth's atmosphere.

The fuel injection system uses a fuel volume arrow rod to control the volume of gaseous fuel that passes through the main body of the fuel injector housing from the fuel hose coupling to the gaseous venturi. The fuel volume arrow rod is controlled by a throttle. With the limiting valve of the present invention, small disposable gas canisters are used with the fuel injection system.

While prior art references disclose engines and machines powered by gaseous hydrocarbon fuels, none discloses a lawn mower with an engine using gaseous fuels. In addition, none of the prior art references describe the use of a fuel injection system or valve with the unique features provided by the present invention.

U.S. Pat. No. 3,978,823, issued to Michael Simon, on Sep. 7, 1976, discloses an LPG burning internal combustion engine, which is not included in or in any way connected with a lawn mower.

U.S. Pat. No. 5,203,046, issued to Patrick A. Shaw, on Apr. 20, 1993, discloses a floor buffing machine powered by propane engine, but does not teach or suggest the use of a propane or other gaseous fuel engine in a lawn mower.

U.S. Pat. No. 5,325,838, issued to David E. Bennett, on Jul. 5, 1994, discloses a liquified petroleum gas fuel injector for an internal combustion engine, but does not teach or suggest its use in a lawn mower.

U.S. Pat. No. 5,377,646, issued to Ronald E. Chasteen, on Jan. 3, 1995, discloses a gaseous fuel management system for an internal combustion engine, but does not teach or suggest its use in a lawn mower.

United Kingdom Patent Specification No. 1,158,934, published Jul. 23, 1969, discloses a method of conversion of fuel gases from the liquid to the gaseous phase.

PCT International Application No. WO 81/00282, published on Feb. 5, 1981, discloses a fuel supply system for internal combustion engines using liquified petroleum gas.

PCT International Application No. WO 92/08888, published on May 29, 1992, discloses a dual fuel injection system and a method of controlling such a system. The first fuel may be gasoline and the second fuel may be a liquified gas.

It may be seen that none of the above-mentioned prior art references teaches or suggests the use of liquified petroleum gas, compressed or liquified natural gas, or a similar fuel, or an engine powered by such a fuel, in a lawn mower. Secondly, none of the above-mentioned prior art references teaches or suggests the use of a fuel injection system or valve with the novel features and characteristics of the present invention.

SUMMARY OF THE INVENTION

Accordingly, it is a principal object of the invention to provide a lawn mower engine that will reduce pollution to the earth's atmosphere.

It is another object of the invention to provide a lawn mower engine that will reduce fuel costs.

It is a further object of the invention to provide means for converting a lawn mower from using liquid hydrocarbon fuels to using gaseous fuels.

It is a further object of the invention to provide a fuel injection system that is clean and efficient.

It is a further object of the invention to provide a limiting valve that allows the use of disposable small gas canisters with equipment that heretofore only used larger gas canisters.

The present invention is a lawn mower which is powered by gaseous fuels. It may be either built originally to use gaseous fuels, or it may be converted from using liquid hydrocarbon fuels such as gasoline or diesel fuel. It may also use a combination of gaseous and liquid hydrocarbon fuels. It may be pushed by hand or be a rider-mower. It is expected that the use of alternative, gaseous fuels in lawn mowers will reduce pollution and fuel costs. The present invention uses a novel fuel injection system which uses a specially designed valve to control the flow of gas from disposable small gas canisters. The fuel injection system is not limited to lawn mowers but can be used with a broad spectrum of existing engine and thermo-technologies; for example, trucks, cars, fork lifts, air craft, tractors, elevators, water pumps, snow blowers, and generators. The fuel injection system is operated either by computer or manually. The fuel injection system uses a fuel volume arrow rod to regulate the flow of gaseous fuel. The fuel volume arrow rod is manipulated by a throttle. The fuel injection system uses a timing device to control the release of fuel into the cylinders, an actuated solenoid switch to adjust the amount of fuel coming from the fuel tank, and has an automatic safety shut off that stops the flow of fuel when the engine stops running. In addition, the fuel injection system can use two or more fuels at the same time. With the novel limiting valve, small disposable gas canisters can be used with the fuel injection system.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a perspective view of the fourth embodiment of the invention.

FIG. 5 is an exploded longitudinal cross-sectional view of the fuel injector used in the fourth embodiment of the invention.

FIG. 6 is an assembled longitudinal side view of the fuel injector used in the fourth embodiment of the invention.

FIG. 7 is an axial view of the docking collar of the fuel injector used in the fourth embodiment of the invention, as seen from the left side of FIGS. 5 and 6.

DETAILED DESCRIPTION OF THE PREFERRED EMBODIMENTS

Figure 1:
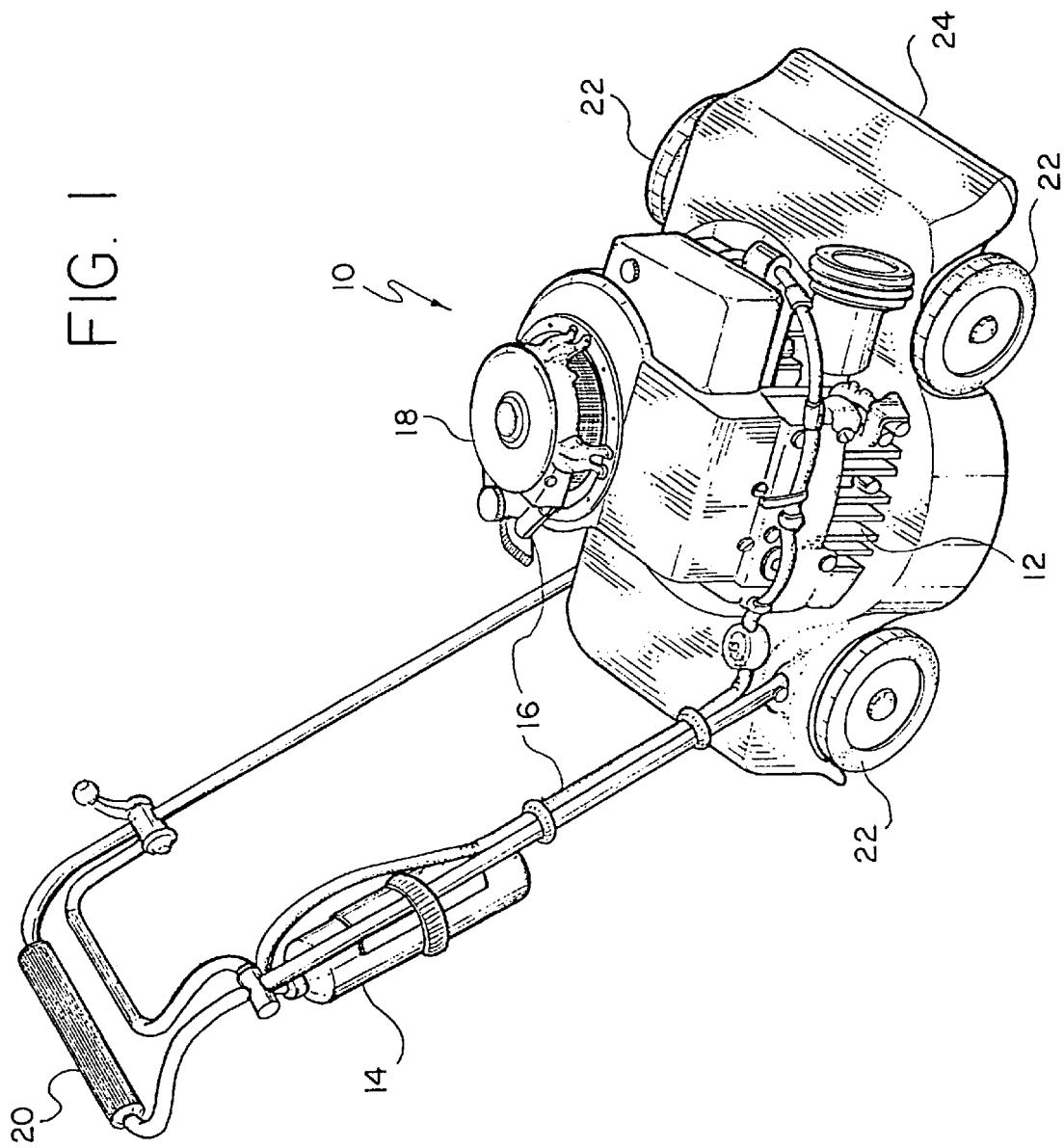
FIG. 1 is a perspective view of the first embodiment of the invention.

FIG. 1 shows the present invention in a first embodiment: an otherwise conventional lawn mower 10 powered by a four-stroke engine 12 that uses LPG as fuel, and that is either self-propelled or pushed by hand by the user. LPG is stored in a fuel tank 14, and transferred by a fuel line 16 having a gas regulator 17 to the carburetor 18, where it is mixed with air and conveyed to the engine. The lawn mower is pushed by a handle 20, rolls on wheels 22, and has blades to cut grass (not shown) under the cover 24. The engine may be an ordinary gasoline engine that is converted to use LPG, with the carburetor adjusted to create the optimum fuel-air mixture for LPG.

Figure 2:
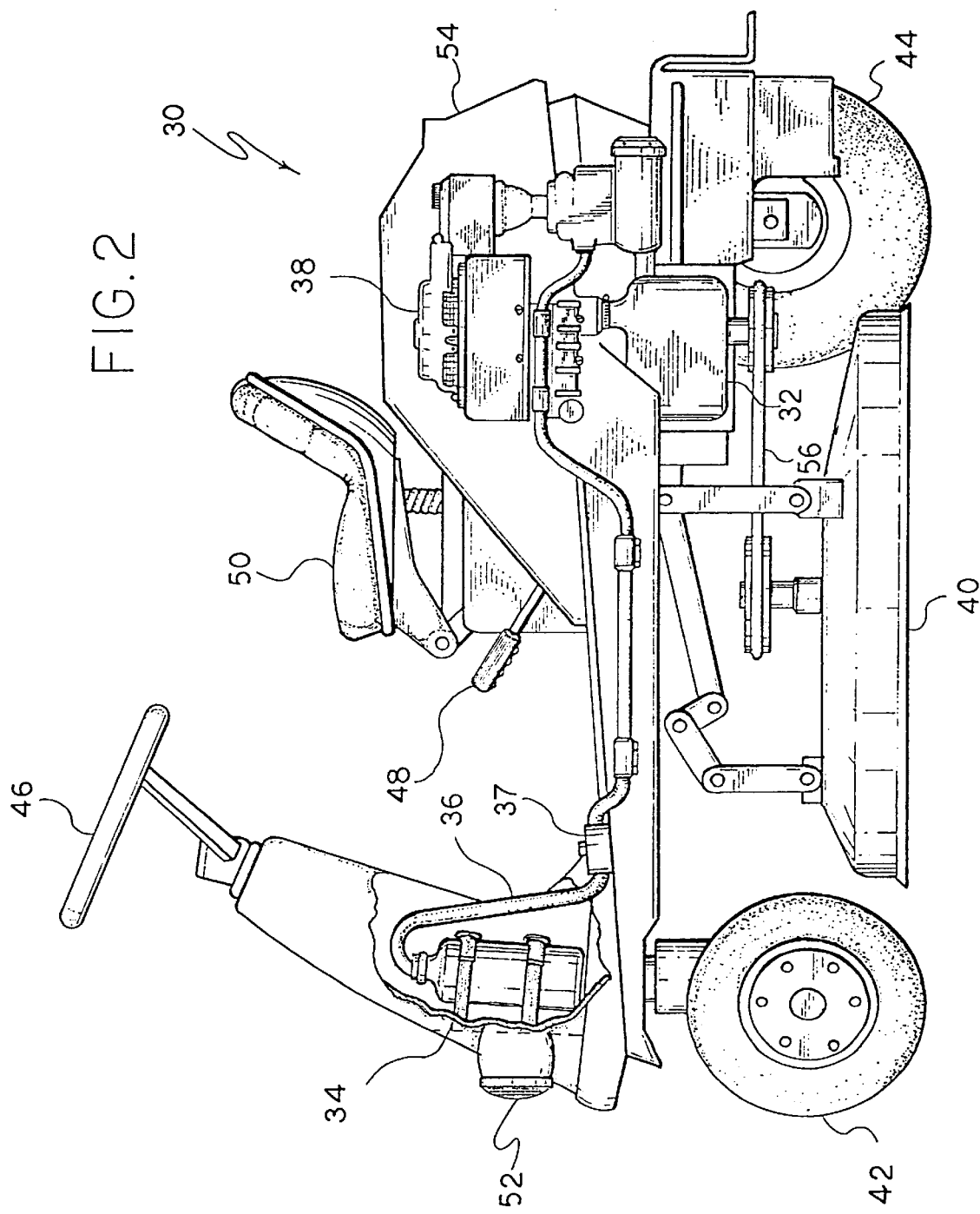
FIG. 2 is a perspective view of the second embodiment of the invention.

FIG. 2 shows the present invention in a second embodiment: a lawn mower 30 powered by a four-stroke engine 32 that uses LPG as fuel, and that is self-propelled, being ridden by the user. LPG is stored in a fuel tank 34, and transferred by a fuel line 36 having a gas regulator 37 to the carburetor 38, where it is mixed with air and conveyed to the engine. The lawn mower has blades to cut grass (not shown) under the cover 40. Also shown are a front wheel 42, a rear wheel 44, a steering wheel 46, a gear shift lever 48, a seat for the user 50, a headlight 52, a chassis 54, and a transmission 56 between the engine and the cutting blades. As in the first embodiment, the engine may be an ordinary gasoline engine that is converted to use LPG, with the carburetor adjusted to create the optimum fuel-air mixture for LPG.

Figure 3:
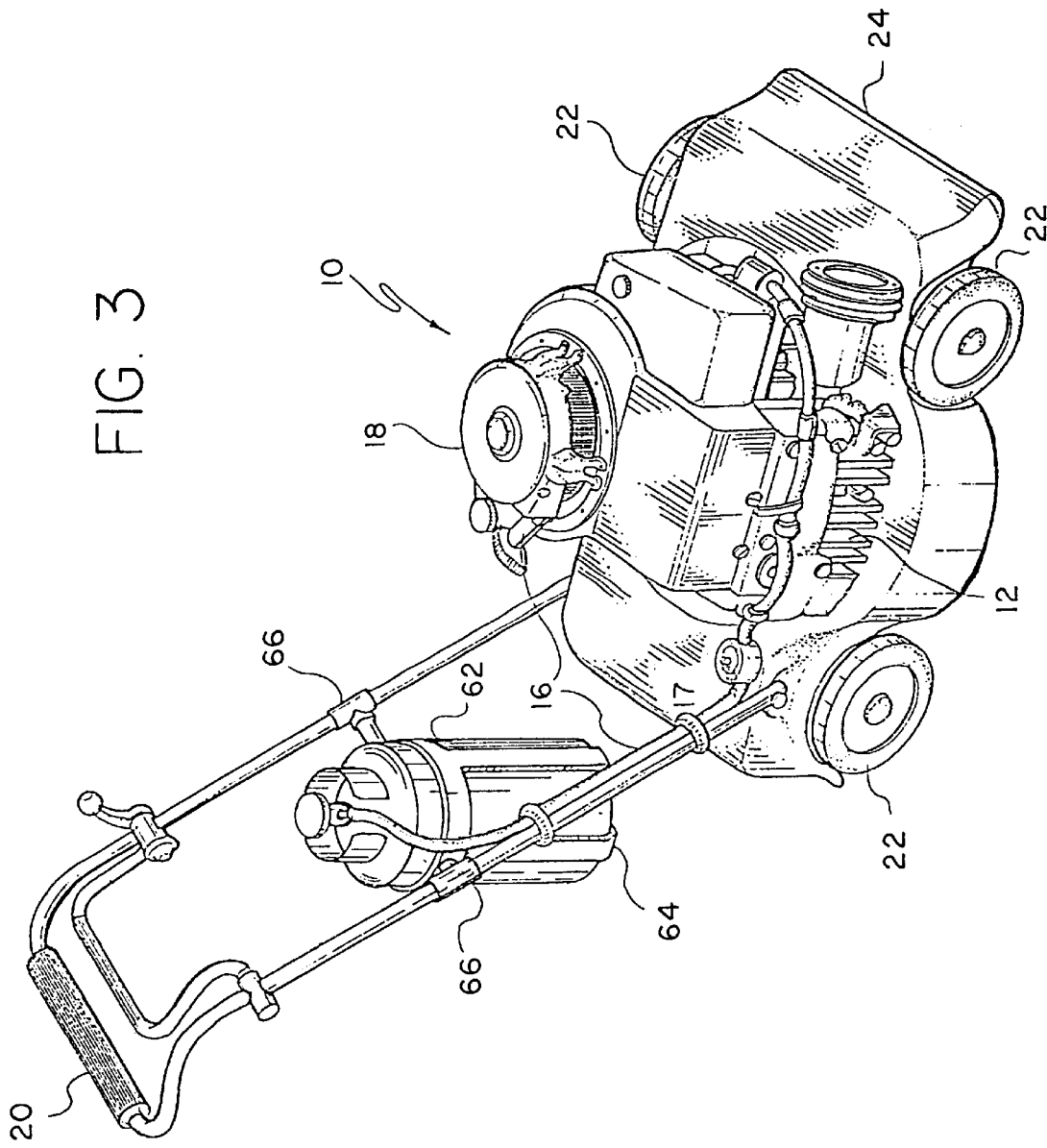
FIG. 3 is a perspective view of the third embodiment of the invention.

FIG. 3 shows the present invention in a third embodiment: an otherwise conventional lawn mower 10 powered by a four-stroke engine 12 that uses LPG as fuel, that is the same as the lawn mower in FIG. 1, except that the fuel tank 62 is retained in a cradle 64 that swings on pivotal connectors 66 attached to the handle of the lawnmower. As in the first embodiment, fuel passes through a fuel line 16 having a regulator 17 to the carburetor 18, where it is; mixed with air and conveyed to the engine. The third embodiment has the advantage that the fuel tank may swing to a vertical position relative to the ground, regardless of the angle of the handle. This may make possible more efficient fuel use. By limiting the area in which the fuel tank swings, the cradle may reduce the risk of injury to the person pushing the mower.

FIG. 4 shows the present invention in a fourth embodiment: an otherwise conventional lawn mower 10 powered by a four-strokes engine 12 that uses LPG as fuel, that is the same as the lawn mower in FIG. 1, except that the carburetor is replaced by a fuel injector 68 and that there is an exhaust pipe 70 with a muffler 72 that releases exhaust under the cover 24. The fuel injector is designed to cause LPG to be burned more efficiently in the engine than it will be with a conventional gasoline carburetor.

FIG. 5 is an exploded longitudinal cross-sectional view of the fuel injector used in the fourth embodiment of the invention, showing a fuel hose coupling 70, a first main body housing member 72, a gaseous venturi 74, a second main body housing member 76, a sleeve 78 that can slide over the air intake holes 80, and a docking collar 82 with slots 84. FIG. 6 is an assembled longitudinal cross-sectional view of the fuel injector. FIG. 7 is an axial view of the docking collar of the fuel injector, as seen from the left side of FIGS. 5 and 6.

Figure 8:
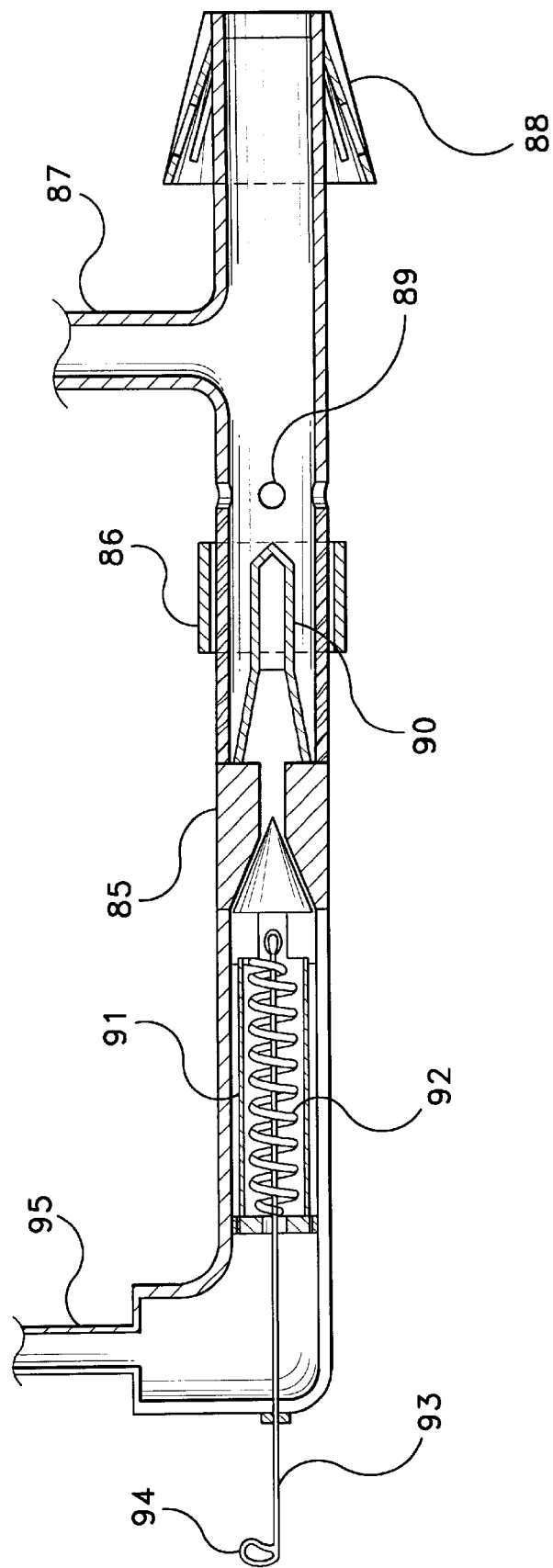
FIG. 8 is a longitudinal cross-sectional view of the assembled fuel injection system.

FIG. 8 shows a preferred embodiment of the fuel injection system. Connected to the main body 85 of the fuel injection system are the fuel hose coupling 95 which brings in fuel to the main body 85 and the blow-by coupling 87 which recirculates any unused fuel or air. A fuel volume arrow rod 93 regulates the amount of fuel burned. A pressure tension spring 92 contained within a pressure tension spring housing 91 maintains pressure on the fuel volume arrow rod 93. The position of the fuel volume arrow rod 93 is controlled by a throttle(not shown) via the eye 94 of the fuel. volume arrow rod 93. The throttle is either a pedal or a lever. FIG. 8 also shows a gaseous venturi 90 which channels the fuel flow, a sleeve 86 that slides over the air intake holes 89 that adjusts the amount of air entering the fuel injection system, and a docking collar 88 that connects to the engine. The air intake holes 89 can be connected to a bottled supplied air source when ambient air is unavailable or not in sufficient quantity or there is concern about the air quality.

Figure 10B:
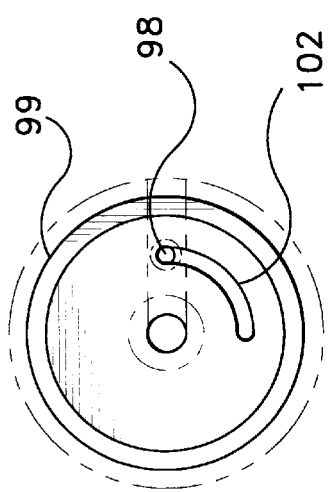
FIG. 10B is an axial view of the valve at the valve stop level along line 10B—10B shown in FIG. 9.
Figure 10A:
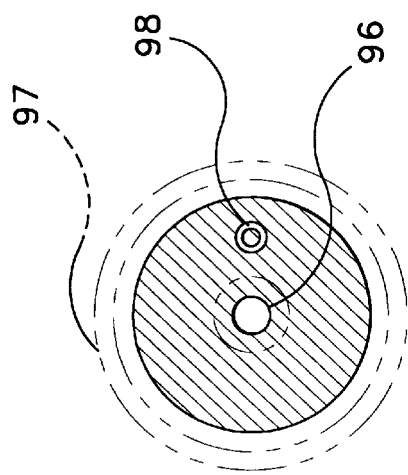
FIG. 10A is an axial view of the valve at the knob with valve stem level along line 10A—10A shown in FIG. 9.
Figure 9:
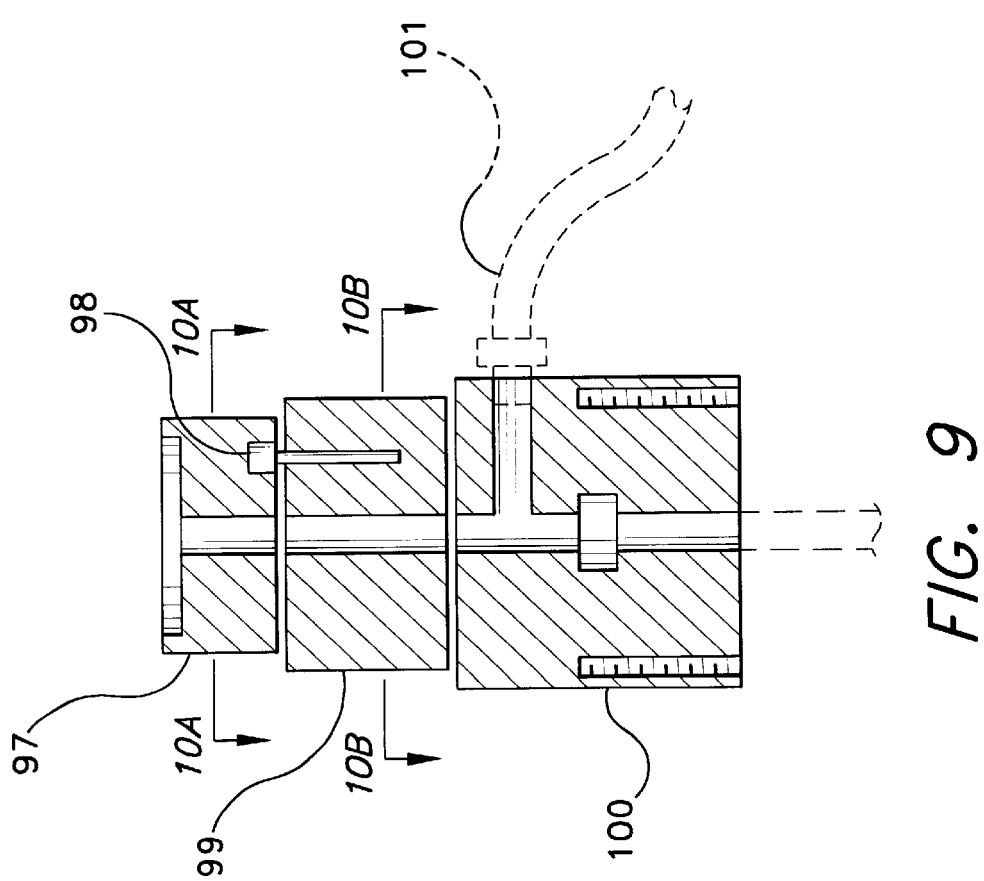
FIG. 9 is a largely diagrammatic, cross-sectional view of the valve according to the present system.

The valve of FIGS. 9, 10A, and 10B is used to supply fuel to the fuel injection system using small disposable gas canisters; for example, a 14.1 oz or a 16 oz propane canister. FIG. 9 shows a knob 97 with stem 96 which adjusts the flow of fuel, a valve pin 98 that acts as a lever to a valve pin slot 102 which limits the amount of fuel, a valve stop 99 that houses the valve pin slot 102 (shown in FIG. 10B), a coupling hose 101, and a valve 100 that controls the flow of fuel and allows the passage or stoppage of fuel. FIGS. 10A and 10B are axial views of the valve shown in FIG. 9.

It is to be understood that the present invention is not limited to the preferred embodiments described above, but: encompasses any and all embodiments within the scope of the following claims. There are numerous variations and modifications of the present invention that are within the scope of the invention as claimed.

I claim:

1. A fuel injection system comprising:

a main body housing;

a coupling connecting a fuel hose and said main body housing;

a coupling connecting a blow-by and said main body housing;

an arrow rod retained within a pressure tension spring housing;

a pressure tension spring connected to said arrow rod wherein said pressure tension spring is retained within said pressure tension spring housing;

said arrow rod has a posterior loop;

a gaseous venturi retained within said main body housing;

an air intake in said main body housing;

a sleeve that can slide over said air intake; and a docking collar with a plurality of slots that fits over said main body housing.

2. The fuel injection system of claim 1 wherein the mixture of fuel and air is controlled by a computer or a computer system.

3. The fuel injection system of claim 1 wherein the fuel is injected directly into the firing chamber.

4. The fuel injection system of claim 1 wherein a timing device is used to time the release of fuel.

5. The fuel injection system of claim 1 wherein two or more fuels are used at the same time.

6. The fuel injection system of claim 1 wherein an actuated solenoid switch controls the amount of fuel coming from the fuel tank.

7. The fuel injection system of claim 1 wherein said posterior loop of said arrow rod is connected to a throttle.

8. The fuel injection system of claim 1 wherein said fuel injection system has automatic shut off.

* * * * *